United States Patent
Parnell

(10) Patent No.: US 8,551,567 B1
(45) Date of Patent: *Oct. 8, 2013

(54) CATALYST DIP

(75) Inventor: Shane R. Parnell, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/489,216

(22) Filed: Jun. 5, 2012

Related U.S. Application Data

(60) Provisional application No. 61/494,302, filed on Jun. 7, 2011.

(51) Int. Cl.
*B05D 3/02* (2006.01)

(52) U.S. Cl.
USPC ........ 427/337; 427/340; 427/372.2; 427/384; 427/385.5; 427/430.1

(58) Field of Classification Search
None
See application file for complete search history.

(56) References Cited

U.S. PATENT DOCUMENTS

| | | | |
|---|---|---|---|
| 6,939,924 B2 * | 9/2005 | Kim et al. | 525/457 |
| 2006/0106158 A1 * | 5/2006 | Dewanjee et al. | 524/589 |
| 2007/0040297 A1 * | 2/2007 | Melanson | 264/236 |
| 2009/0176023 A1 * | 7/2009 | Sullivan et al. | 427/322 |
| 2010/0084779 A1 * | 4/2010 | Matroni et al. | 264/129 |
| 2010/0330285 A1 * | 12/2010 | Melanson | 427/372.2 |
| 2011/0212266 A1 * | 9/2011 | Nagasawa et al. | 427/372.2 |
| 2012/0021850 A1 * | 1/2012 | Kennedy | 473/371 |

* cited by examiner

*Primary Examiner* — Erma Cameron
(74) *Attorney, Agent, or Firm* — Sonia Lari; Michael Catania; Rebecca Hanovice

(57) ABSTRACT

The present invention relates to a method for forming a golf ball. The method comprises mixing a polyisocyanate crosslinker with a base TPU cover material, wherein the polyisocyanate crossliker is aliphatic, miscible with the base TPU cover material and has functionalities greater than or equal to 2. The method further comprises dipping a golf ball in a catalyst solution, wherein the catalyst solution is allowed to absorb into a cover of the golf ball and heating the golf ball to allow continued diffusion of the catalyst solution into the cover of the golf ball.

5 Claims, 1 Drawing Sheet

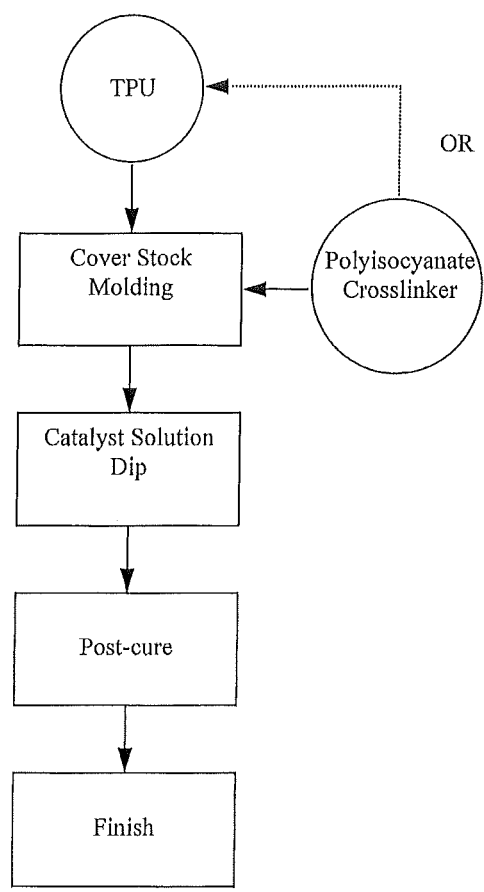

CATALYST DIP

CROSS REFERENCES TO RELATED APPLICATIONS

The Present Application claims priority to U.S. Provisional Patent Application No. 61/494,302, filed on Jun. 7, 2012, which is hereby incorporated by reference in its entirety.

STATEMENT REGARDING FEDERALLY SPONSORED RESEARCH OR DEVELOPMENT

Not Applicable

BACKGROUND OF THE INVENTION

1. Field of the Invention

The present invention relates to a method for improving golf ball covers. More specifically, the present invention relates to a method for improving the cover shear durability of golf ball covers.

2. Description of the Related Art

When used in golf ball cover stock, injection moldable TPUs offer significant economic advantages over thermoset polyurethanes and polyureas. They can also be formulated to exhibit attractive properties with good "feel", controllability, and rebound resilience. Several methods have been used to improve the physical property profile and groove shear durability (i.e. resistance to scuffing, cutting, and tearing) of thermoplastic polyurethane ("TPU") golf ball covers. Some include incorporating polyisocyanates into the TPU cover layer either before or during injection molding in an effort to impart chemical cross-linking. For example, U.S. Pat. No. 6,663,507 and US Patent Applications 2008/0161134 and 2008/0207846 describe dry blending polyioscyanate masterbatches with TPU prior to injection molding. Disadvantages of this prior art include low polyisocyanate reactivity, conversion, cross-linking, and thus durability improvement. Conversely, high polyisocyanate reactivity in the melt can cause TPU molecular weight loss with diisocyanates and rapid molecular weight growth with triisocyantes and higher order polyisocyanates. In both cases, the resulting changes in melt viscosity limit processibility, especially in the context of thin wall injection molding.

The prior art is lacking in a method that results in the use of polyisocyanates with reduced reactivity which minimizes polyisocyanate conversion in the melt and effectively decouples the molding process from polyisocyanate crosslinking, hence allowing increased processibility. It has been discovered that exposing TPU cover layers to a catalyst solution following injection molding maximizes polyisocyanate conversion and thus durability.

BRIEF SUMMARY OF THE INVENTION

The present invention relates to a method for forming a golf ball. The method comprises mixing a polyisocyanate crosslinker with a base TPU cover material, wherein the polyisocyanate crossliker is aliphatic, miscible with the base TPU cover material and has functionalities greater than or equal to 2. The method further comprises dipping a golf ball in a catalyst solution, wherein the catalyst solution is allowed to absorb into a cover of the golf ball and heating the golf ball to allow continued diffusion of the catalyst solution into the cover of the golf ball.

Having briefly described the present invention, the above and further objects, features and advantages thereof will be recognized by those skilled in the pertinent art from the following detailed description of the invention when taken in conjunction with the accompanying drawings.

BRIEF DESCRIPTION OF THE SEVERAL VIEWS OF THE DRAWINGS

FIG. 1 is a flow diagram of the method of the present invention.

DETAILED DESCRIPTION OF THE INVENTION

Polyisocyanates are mixed with the base TPU cover material before or during injection molding. Preferred polyisocyanates are aliphatic to limit reactivity, are miscible with the base TPU, and have functionalities 2 to maximize final crosslink density. Preferably, they are added in masterbatch form and dry blended with the base TPU cover stock before injection molding. These masterbatches can be made on a twin screw extruder and TPU or other thermoplastic elastomers can be used as carrier resins.

As shown in FIG. 1, the method of the present invention comprises missing a polyisocyanate crosslinker with a base TPU over cover stock molding, dipping the golf ball in the catalysts dip solution and post-curing the golf ball.

Subsequent to injection molding, balls are dipped in a catalyst solution whereby the catalyst is allowed to absorb or diffuse into the cover of the golf ball. Preferred catalysts include organometallic compounds normally used in isocyanate reactions. Preferred solvents include acetone. After dipping, the balls are heated to remove solvent and to allow continued diffusion of catalyst into the cover of the golf ball. More importantly, this post-cure step promotes the reaction of polyisocyanate with TPU.

Polyisocyanates function as crosslinkers in the TPU golf ball cover. Excess isocyanate functionality reacts with active hydrogen functionality on TPU chain ends to extend chain length and thus increase molecular weight. Similarly, excess isocyanate functionality can also react with urethane linkages to form allophonate bonds. In the presence of specific catalysts, other reactions are also possible. Ultimately, multifunctional polyisocyanate reactions result in intermolecular cross-linking which improves groove cover shear durability. Reaction type, reaction kinetics, and overall extent of reaction are largely controlled by catalyst type and concentration.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

I claim:

1. A method for forming a golf ball, the method comprising:

mixing a polyisocyanate crosslinker with a base thermoplastic polyurethane cover material to form an injection molding material, wherein the polyisocyanate crosslinker is aliphatic, miscible with the base thermoplastic polyurethane cover material and has functionalities greater than or equal to two;

injection molding a golf ball cover from the injection molding material;

dipping the golf ball in a catalyst solution, wherein the catalyst solution is allowed to absorb into a cover of the golf ball; and heating the golf ball to allow continued diffusion of the catalyst solution into the cover of the golf ball.

2. The method according to claim 1 wherein the polyisocyanate crosslinker is added in a masterbatch form and dry blended with the base thermoplastic polyurethane cover material before injection molding.

3. The method according to claim 2 wherein the masterbatch is made on a twin screw extruder and the thermoplastic polyurethane cover material is used as a carrier resin.

4. The method according to claim 1 wherein the catalyst solution comprises an organometallic compound.

5. A method for forming a golf ball, the method comprising:

mixing a polyisocyanate crosslinker with a base thermoplastic polyurethane cover material to form an injection molding material during an injection molding of a golf ball cover, wherein the polyisocyanate crosslinker is aliphatic, miscible with the base thermoplastic polyurethane cover material and has functionalities greater than or equal to two;

dipping the golf ball in a catalyst solution, wherein the catalyst solution is allowed to absorb into the golf ball cover; and heating the golf ball to allow continued diffusion of the catalyst solution into the golf ball cover.

* * * * *